July 19, 1927.
W. L. PATTERSON
PROJECTION APPARATUS
Filed Jan. 18, 1924
1,636,647
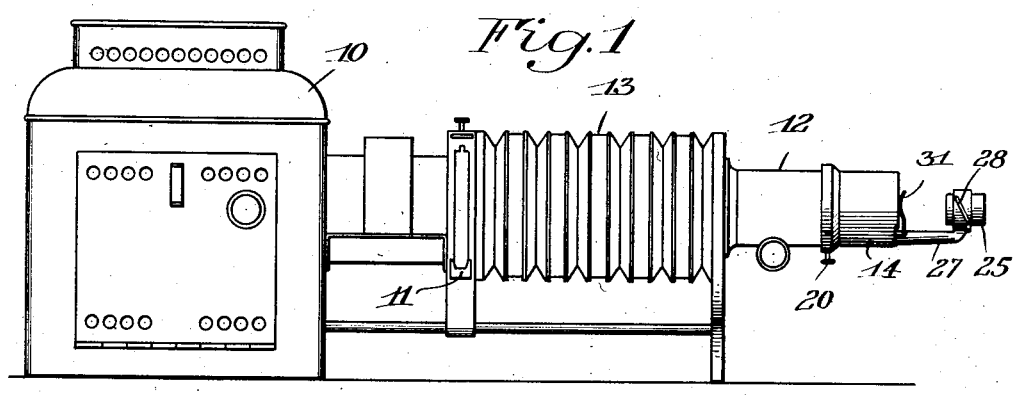
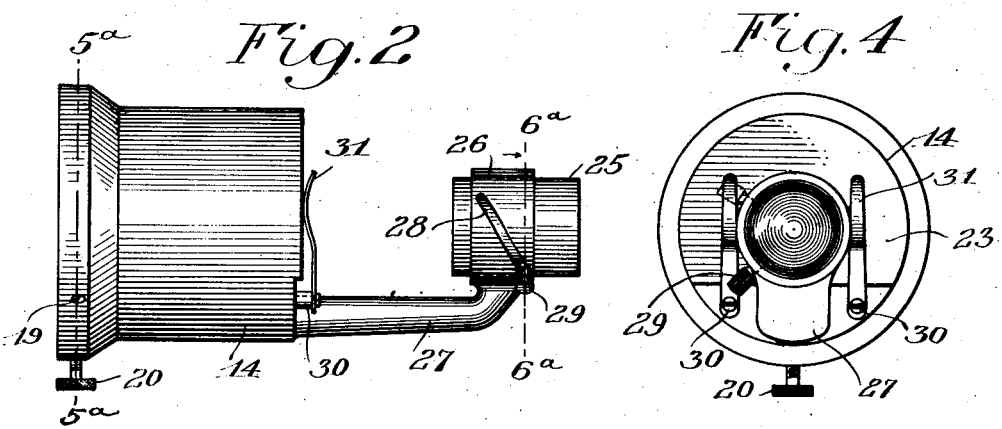
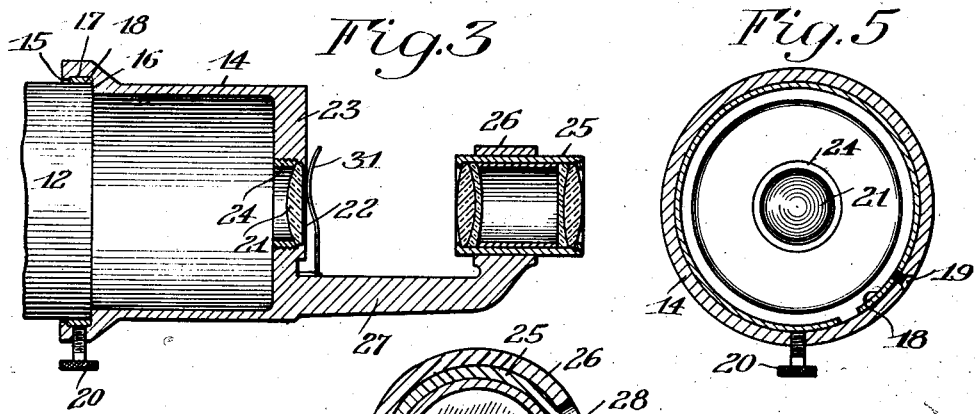
INVENTOR.
William L. Patterson
BY
his ATTORNEY Patented July 19, 1927.

1,636,647

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

Application filed January 18, 1924. Serial No. 687,103.

This invention relates to projection apparatus and more particularly to the variety provided with means for microscopical projection, or, in other words, for projecting magnified images of microscopical slides, one object of the invention being to provide an apparatus of this character of comparatively simple and inexpensive form, convenient to adjust and operate. Another object is the provision of such an apparatus having a microscopical projecting portion in the form of a convenient attachment capable of being readily applied to or removed from a projection lantern, for changing from the projection of ordinary slides to those of a microscopical character and vice versa. Another object is the provision of such an apparatus comprising a conveniently detachable projection microscope portion adapted for application to and removable from a complete projection lantern and for cooperation with the latter independently of its focusing adjustment so that the change from one form of projection to the other may be quickly made in operation without the replacement or adjustment of any parts of the projection lantern proper. A further object is the provision of a convenient one piece attachment of the nature described comprising simple manual means for applying the same to and removing it from the objective lens barrel commonly provided in projection lanterns in a form accessible for this purpose.

To these and other ends the invention resides in certain improvements and combinations of parts all as will be hereinafter more fully described, the novel features being pointed out in the claims at the end of the specification In the drawings:

Fig. 1 is a side elevation of a projection lantern and microscope attachment embodying the present invention.

Fig. 2 is an enlarged side elevation of the projection microscope.

Fig. 3 is a longitudinal sectional elevation of the same.

Fig. 4 is an end elevation as viewed from the right in Fig. 2.

Fig. 5 is a sectional view on the line 5ª—5ª in Fig. 2 and

Fig. 6 is a sectional view on the line 6ª—6ª in Fig. 2.

Similar reference numerals throughout the several views indicate the same parts.

The present embodiment of the invention provides an apparatus of the class described of moderate microscopical power and capable of being produced at moderate cost, being particularly advantageous for general use, such for example, as in the school study of microscopical slides of plant stems, flowers, insects and the like, where a relatively simple and inexpensive instrument is required adapted for quickly changing from ordinary to microscopical projection and vice versa. To this end the invention is embodied in an ordinary form of projection lantern combined with a projecting microscope portion in the form of a simple, unitary attachment convenient to focus and provided with simple means for detachably applying the same to the forwardly extending objective lens barrel with which projection lanterns are commonly constructed.

Referring more particularly to the drawings, there is shown at 10, Fig. 1, the lamp house of a projection lantern of known or suitable construction, having a lantern slide stage, 11, and an objective lens barrel 12 extending forwardly from the usual bellows 13 of the optical system.

The projection microscope attachment is preferably in the form of a unitary frame best shown in Figs. 2 and 3 as comprising a cylindrical barrel 14 one end of which has its inner diameter enlarged, as at 15, to provide a circumferential seat 16. The enlarged bore portion 15 is preferably larger in diameter than the outer circumference of the objective lens barrel of the projection lantern with which the attachment is to be used, in order that it may be telescopically fitted thereto, as shown in Fig. 3. This enlarged attaching portion of the microscope barrel is preferably recessed circumferentially interiorly as at 17 to receive a resilient ring 18, Figure 5 having ends one of which is fixed to the cylindrical portion 14 as by means of a screw 19. A thumb screw 20 is provided to thrust against the movable other end of the ring for clamping the same and the attachment as a whole to the lantern barrel 12, with the latter against the seat 16.

The lens system of the microscope attachment comprises preferably a condensing lens 21 mounted in a seat in the circumference of an opening 22 in the opposite end wall 23 of the barrel 14 and secured on its seat as by means of the threaded ring 24. Cooperating with this condenser is an objective lens system comprising, in the present instance, four pieces mounted in any known or suitable manner in a sleeve 25 sliding longitudinally in a bearing 26 carried at the end of an arm 27 extending integrally from the barrel 14. Preferably bearing 26 is spirally slotted as at 28, Figs. 2 and 6, and sleeve 25 carries a finger piece or stud 29 working in and projecting through this slot 28. By moving the finger piece longitudinally of the slot, the objective lens set is given a focusing movement, as well understood in the art. This microscope lens system is adapted for cooperation with the lens system of the lantern proper independently of the focusing adjustment of the latter so that the lantern requires no refocusing when the microscope attachment is applied.

A slide stage is conveniently disposed at the end 23 of the barrel 14 comprising a pair of studs 30 fixed in the barrel end on opposite sides of the arm 27 for supporting the bottom edge of a slide. The studs carry at their outer ends spring clips 31 for holding a slide against the barrel end adjacent the condenser lens carried thereby.

The projection microscope attachment of the present invention is readily applicable to various projection lanterns already in use by variation, if necessary, in the internal diameter of the barrel enlargement 15 or by providing an adapting fitting for insertion in this enlargement, as, for example, by providing clamping rings 18 of different thicknesses. Various modifications may be made in the optical system and other portions of the attachment while retaining the advantageous principles involved. The invention thus provides a projection apparatus of simple, convenient and inexpensive form capable of being quickly and easily adapted for the projection of ordinary lantern slides or slides of a microscopical character.

I claim as my invention:

1. The combination with a projection lantern having objective lens means, of a projecting microscope therefor disposed in the optical axis beyond the objective lens means of said lantern and comprising condensing and objective lens means having a relative focusing adjustment and a slide stage located between said microscope lens means.

2. The combination with a projection lantern having focusing means and an objective lens system including a barrel, of a detachable, unitary projection microscope comprising a barrel portion adapted for attachment to the barrel of the lantern, a lens system in said barrel portion adapted for cooperation with said lantern independently of the focusing adjustment of the latter.

3. The combination with a projection lantern having an objective lens barrel, of a projection microscope adapted for cooperation with said lantern, and a device for detachably securing said microscope on said lens barrel.

4. The combination with a complete projection lantern comprising an objective lens barrel, of a projection microscope of unitary construction comprising a lens system adapted for cooperation with said lantern in all focusing adjustments thereof, and a device for detachably securing said microscope on said lens barrel.

5. The combination with a projection lantern having an objective lens barrel, of a projection microscope comprising a unitary mounting, a condenser on said mounting, an objective lens system adjustably carried by said mounting, and a device for detachably securing said mounting to said lens barrel.

6. The combination with a complete projection lantern comprising an objective lens barrel, of a projection microscope comprising condensing and objective lens means adapted for cooperation with said lantern independently of the focusing adjustment of the latter, a slide stage between said microscope lens means, a unitary mounting for said microscope lens means and slide having a barrel telescopically fitting said lens barrel, and a device for detachably securing said lens barrels together.

7. As an article of manufacture, an attachment for a projection lantern having a lens holding barrel comprising a projection microscope lens system, a frame carrying said lens system, a slide stage on said frame, and a barrel portion on said frame detachably slidable over the lens barrel of the lantern.

8. As an article of manufacture, an attachment for a projection lantern having a lens holding barrel comprising a unitary frame provided with spaced mounts for condensing and objective means respectively, said objective lens means having a focusing spiral adjustment in its mount, a slide stage on said frame between said lens mounts, a barrel portion on said frame, and a device for detachably securing said barrel portion to the barrel of said lantern.

WILLIAM L. PATTERSON.